(12) United States Patent
Ishimoto et al.

(10) Patent No.: US 8,814,271 B2
(45) Date of Patent: Aug. 26, 2014

(54) VEHICLE SEAT

(75) Inventors: Manabu Ishimoto, Chiryu (JP); Yuji Yamada, Toyota (JP); Keisuke Ishizaki, Nishio (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/699,545

(22) PCT Filed: Aug. 5, 2010

(86) PCT No.: PCT/JP2010/063287
§ 371 (c)(1),
(2), (4) Date: Nov. 21, 2012

(87) PCT Pub. No.: WO2012/017539
PCT Pub. Date: Feb. 9, 2012

(65) Prior Publication Data
US 2013/0127222 A1   May 23, 2013

(51) Int. Cl.
*A47C 1/10* (2006.01)
*A47C 7/36* (2006.01)
*A61G 15/00* (2006.01)
*B60R 22/28* (2006.01)

(52) U.S. Cl.
USPC ........... 297/408; 297/404; 297/399; 297/220; 297/391

(58) Field of Classification Search
USPC ........... 297/331, 332, 333, 404, 408, 61, 410, 297/401, 399, 220, 391
See application file for complete search history.

(56) References Cited

U.S. PATENT DOCUMENTS

| | | | | |
|---|---|---|---|---|
| 4,678,232 A * | 7/1987 | Ishida et al. | | 297/408 |
| 4,991,907 A * | 2/1991 | Tanaka | | 297/408 |
| 5,378,043 A * | 1/1995 | Viano et al. | | 297/408 |
| 6,217,128 B1 * | 4/2001 | Tillman, Jr. | | 303/9.61 |
| 6,361,113 B2 * | 3/2002 | Heilig | | 297/410 |
| 6,880,891 B2 * | 4/2005 | Yetukuri et al. | | 297/410 |
| 6,899,395 B2 * | 5/2005 | Yetukuri et al. | | 297/408 |
| 7,059,681 B2 * | 6/2006 | Kubo | | 297/410 |
| 8,083,291 B2 * | 12/2011 | Yoshida | | 297/408 |
| 8,322,790 B2 * | 12/2012 | Tscherbner | | 297/408 |
| 8,348,347 B2 * | 1/2013 | Willard et al. | | 297/408 |
| 2003/0222492 A1 * | 12/2003 | Nemoto et al. | | 297/410 |
| 2004/0245834 A1 | 12/2004 | Schmitt et al. | | |
| 2006/0163930 A1 * | 7/2006 | Pettersson et al. | | 297/408 |

FOREIGN PATENT DOCUMENTS

| | | |
|---|---|---|
| GB | 2 403 140 A | 12/2004 |
| JP | U-61-190248 | 11/1986 |
| JP | A-62-190543 | 8/1987 |

(Continued)

*Primary Examiner* — Chi Q Nguyen
(74) *Attorney, Agent, or Firm* — Oliff PLC

(57) ABSTRACT

A headrest with a function of a dynamic damper that damps vibrations of a vehicle seat, and provide the headrest with an impact absorbing function with respect to a head portion of a seated vehicle occupant. A stay of a headrest is held at a seat back, and a cover, that covers at least a portion of the stay, is supported at the stay so as to be swingable in a seat front-rear direction around a seat transverse direction. Due to a torsion coil spring (an elastic member) elastically deforming when the cover swings, restoring force in a direction opposing a swinging direction of the cover is generated. Further, displacement other than in the swinging direction is suppressed by a suppressing portion that is provided between the stay and the cover.

12 Claims, 15 Drawing Sheets

(56) References Cited

FOREIGN PATENT DOCUMENTS

| JP | U-63-3257 | 1/1988 |
| JP | U-5-93296 | 12/1993 |
| JP | A-11-262426 | 9/1999 |
| JP | A-2001-314270 | 11/2001 |
| JP | A-2003-339472 | 12/2003 |
| JP | A-2004-530496 | 10/2004 |
| JP | A-2005-287967 | 10/2005 |
| JP | A-2009-213587 | 9/2009 |

* cited by examiner

VEHICLE SEAT

TECHNICAL FIELD

The present invention relates to a vehicle seat.

BACKGROUND ART

There is disclosed a structure in which angle adjustment, in the front-rear direction, of a headrest is made possible by mounting a headrest frame to a horizontal supporting portion of a headrest stay via a headrest spring, and a rotary-type damper or a piston-type damper is added between the horizontal supporting portion of the headrest stay and the headrest frame (refer to Patent Document 1),

PRIOR ART DOCUMENTS

Patent Documents

[Patent Document 1] Japanese Patent Application Laid-Open No. 11-262426

SUMMARY OF INVENTION

Technical Problem

However, in a case of providing a damper within a headrest such as the above-described conventional example, the structure becomes complex, which is thought to lead to an increase in the mass of the headrest and the cost.

In view of the above-described circumstances, an object of the present invention is to, by a simple structure, provide a headrest with the function of a dynamic damper that damps vibrations of a vehicle seat, and provide the headrest with an impact absorbing function with respect to the head portion of a seated vehicle occupant.

Solution to Problem

A first aspect of the present invention has: a stay that is held at a seat back; a cover that covers at least a portion of the stay, and that is supported at the stay so as to be swingable in a seat front-rear direction around a seat transverse direction; an elastic member that is interposed between the cover and the stay, and that, when the cover swings, elastically deforms and generates restoring force in a direction opposing a swinging direction of the cover; and a suppressing portion that is provided between the stay and the cover, and that suppresses displacement of the cover in other than the swinging direction.

In the vehicle seat relating to the first aspect, the stay of the headrest is held at a seat back, and the cover, that covers at least a portion of the stay, is supported at the stay so as to be swingable in the seat front-rear direction around the seat transverse direction. Due to the elastic member elastically deforming when the cover swings, restoring force in a direction opposing the swinging direction of the cover is generated. Further, displacement in other than the swinging direction is suppressed by the suppressing portion that is provided between the stay and the cover. Due thereto, by a simple structure, the headrest is provided with the function of a dynamic damper that damps vibrations of a vehicle seat, and can be provided with an impact absorbing function with respect to the head portion of a seated vehicle occupant.

In a second aspect of the present invention, in the vehicle seat relating to the first aspect, the stay has a vertical bar portion that is held at the seat back and that extends toward a seat upper side, and a horizontal bar portion that is continuous with the vertical bar portion and extends in the seat transverse direction, and the cover is supported at the horizontal bar portion, and the suppressing portion is fit-together with the horizontal bar portion.

In the vehicle seat relating to the second aspect, the cover of the stay can swing in the seat front-back direction around the horizontal bar portion of the stay, and, due to the suppressing portion that fits-together with this horizontal bar portion, displacement of the cover other than in the swinging direction is suppressed. Therefore, by a simple structure, the headrest is provided with the function of a dynamic damper that damps vibrations of a vehicle seat, and can be provided with an impact absorbing function with respect to the head portion of a seated vehicle occupant, while an increase in cost is suppressed.

In a third aspect of the present invention, the vehicle seat relating to the second aspect the suppressing portion also serves as a supporting portion of the cover with respect to the stay.

In the vehicle seat relating to the third aspect, because the suppressing portion also serves as the supporting portion of the cover with respect to the stay, the structure becomes even more simple, and an increase in cost can be suppressed.

In a fourth aspect of the present invention, in the vehicle seat relating to the second aspect or the third aspect, the elastic member is fixed to the cover, and is fit-together with the vertical bar portion so as to elastically deform when the cover swings in the seat front-rear direction.

In the vehicle seat relating to the fourth aspect, the elastic member is fixed to the cover, and is fit-together with the vertical bar portion of the stay. Therefore, when the headrest swings, the elastic member swings together with the cover while still abutting the vertical bar portion, and elastically deforms due to the relative displacement between the elastic member and this vertical bar portion. Therefore, generation of abnormal sound between the elastic member and the vertical bar portion is suppressed, and the product value can be increased.

In a fifth aspect of the present invention, in the vehicle seat relating to the fourth aspect, the elastic member is inserted into the vertical bar portion side through an opening that is provided in a side portion of the cover.

In the vehicle seat relating to the fifth aspect, because the elastic member is a structure that is inserted into the vertical bar portion side through an opening provided in the side portion of the cover, the workability at the time of mounting this elastic member is good.

In a sixth aspect of the present invention, in the vehicle seat relating to the fifth aspect, a plurality of the openings are provided in a seat vertical direction.

In the vehicle seat relating to the sixth aspect, because a plurality of the openings at the side portion of the cover are provided in the seat vertical direction, the height position at which the elastic member is inserted can be selected appropriately. Therefore, the resonance frequency of the headrest as a dynamic damper can be tuned easily.

In a seventh aspect of the present invention, in the vehicle seat relating to the fifth aspect or the sixth aspect, an engagement portion, that engages with the cover when insertion into the opening is completed, is provided at the elastic member.

In the vehicle seat relating to the seventh aspect, when insertion of the elastic member into the opening of the side portion of the cover is completed, the engaging portion engages with the cover, and therefore, the workability at the time of mounting this elastic member is good.

In an eight aspect of the present invention, the vehicle seat relating to the second aspect or the third aspect has: a second elastic member whose upper end is connected to the elastic member side, and whose lower end is connected to the stay further toward a seat lower side than the elastic member, and that can extend and contract in a seat vertical direction; and a rope whose one end side is connected to the seat back side, and whose other end side is connected to the elastic member, and that extends toward a seat upper side from the one end, and inverts at a guide portion that is further toward a seat upper side than the elastic member, and extends toward a seat lower side and arrives at the other end, wherein, when the headrest moves upward, the elastic member is pulled by the rope and moves toward a seat upper side, and, when the headrest moves downward, the elastic member is pulled by urging force of the second elastic member and moves toward a seat lower side.

In the vehicle seat relating to the eighth aspect, at the time of adjusting the height of the headrest, when the headrest is moved upward, due to the elastic member being pulled by the rope and moving toward the seat upper side, the resonance frequency of the headrest as a dynamic damper becomes lower. When the height position of the headrest is raised, the resonance frequency of the vehicle seat becomes lower, but vibrations of the vehicle seat can be damped appropriately by lowering the resonance frequency of the headrest as a dynamic damper in accordance therewith.

Further, at the time of adjusting the height of the headrest, when the headrest is moved downward, due to the elastic member being pulled by the urging force of the second elastic member and moving toward the seat lower side, the resonance frequency of the headrest as a dynamic damper becomes higher. When the height position of the headrest is lowered, the resonance frequency of the vehicle seat becomes higher, but vibrations of the vehicle seat can be damped appropriately by raising the resonance frequency of the headrest as a dynamic damper in accordance therewith.

In this way, in the vehicle seat relating to the eight aspect, the resonance frequency as a dynamic damper can be changed appropriately in accordance with the height adjustment of the headrest.

Advantageous Effects of Invention

As described above, in accordance with the vehicle seat relating to the first aspect of the present invention, the excellent effect is obtained that, by a simple structure, a headrest is provided with the function of a dynamic damper that damps vibrations of a vehicle seat, and can be provided with an impact absorbing function with respect to the head portion of a seated vehicle occupant.

In accordance with the vehicle seat relating to the second aspect, the excellent effect is obtained that, by a simple structure, a headrest is provided with the function of a dynamic damper that damps vibrations of a vehicle seat, and can be provided with an impact absorbing function with respect to the head portion of a seated vehicle occupant.

In accordance with the vehicle seat relating to the third aspect, the excellent effects are obtained that the structure becomes even more simple, and an increase in cost can be suppressed.

In accordance with the vehicle seat relating to the fourth aspect, the excellent effects are obtained that generation of abnormal sound between the elastic member and the vertical bar portion is suppressed, and the product value can be increased.

In accordance with the vehicle seat relating to the fifth aspect, the excellent effect is obtained that the workability at the time of mounting this elastic member is good.

In accordance with the vehicle seat relating to the sixth aspect, the excellent effect is obtained that the resonance frequency of the headrest as a dynamic damper can be tuned easily.

In accordance with the vehicle seat relating to the seventh aspect, the excellent effect is obtained that the workability at the time of mounting the elastic member is good.

In accordance with the vehicle seat relating to the eighth aspect, the excellent effect is obtained that the resonance frequency as a dynamic damper can be changed appropriately in accordance with the height adjustment of the headrest.

BRIEF DESCRIPTION OF DRAWINGS

FIG. 1 is a side view showing a seat back and a headrest at a vehicle seat.

FIG. 2 is a partially broken front view showing the internal structure of the headrest.

FIG. 3 is an enlarged sectional view seen along arrow 3-3 in FIG. 2, and showing a fit-together state of a suppressing portion with respect to a horizontal bar portion of a stay.

FIG. 4 is a partially broken front view showing the internal structure of a headrest.

FIG. 5 is a cross-sectional view seen along arrow 5-5 in FIG. 4, and showing the internal structure of the headrest.

FIG. 6 is an exploded perspective view showing a headrest.

FIG. 7 is a side view showing the headrest.

FIG. 8 is an enlarged sectional view seen along arrow 8-8 in FIG. 7, and showing a clip that is fixed to a cover and is fit-together with a vertical bar portion of a stay.

FIG. 9 is an enlarged sectional view corresponding to FIG. 8, and showing a modified example of the clip.

FIG. 10 is an enlarged sectional view showing a fit-together state of a suppressing portion with respect to a horizontal bar portion of a stay.

FIG. 11 is a partially broken front view showing that a mounting height of the clips can be selected arbitrarily.

FIG. 12 is a partially broken front view showing a modified example.

FIG. 13 is a partially broken perspective view showing the modified example.

FIG. 14 is a cross-sectional view showing a state in which a clip moves toward a seat upper side as a headrest moves upward.

FIG. 15 is a cross-sectional view showing a state in which the clip moves toward a seat lower side as the headrest moves downward.

DESCRIPTION OF EMBODIMENTS

Embodiments of the present invention are described hereinafter on the basis of the drawings.

[First Embodiment]

Figure 1:
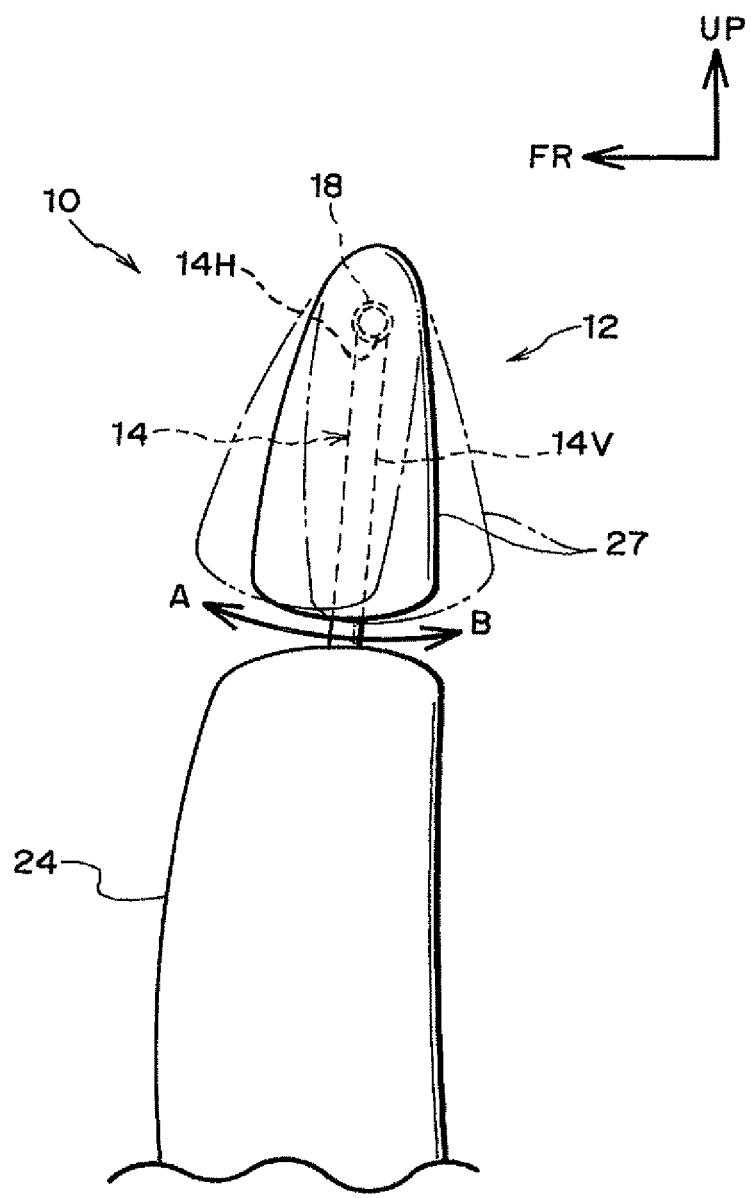
FIG. 1 through FIG. 3 relate to a first embodiment.
Figure 2:
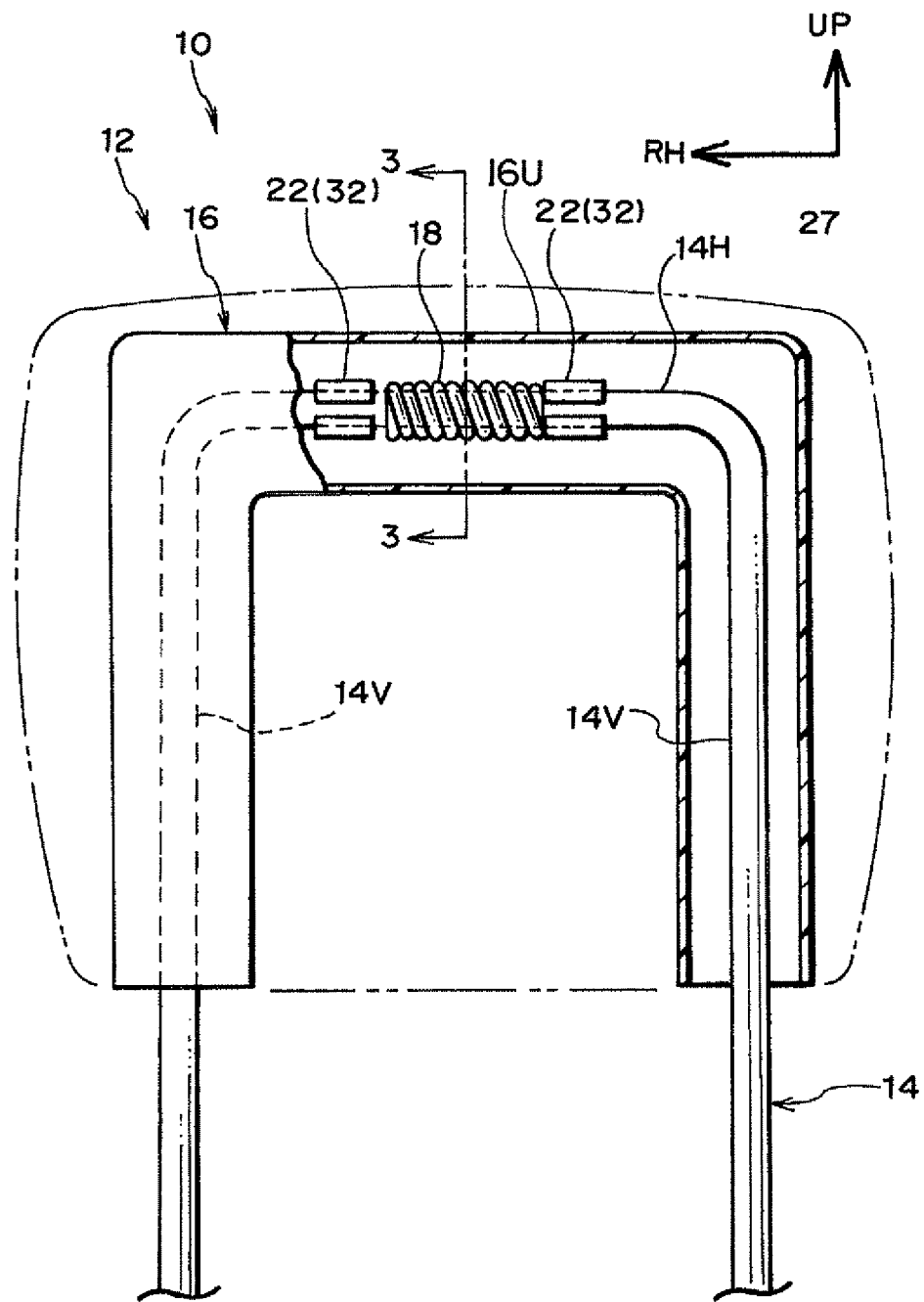

In FIG. 1, a vehicle seat 10 relating to the present embodiment has a headrest 12. In FIG. 2, the headrest 12 has a stay 14, a cover 16, a torsion coil spring 18 that is an example of an elastic member, and suppressing portions 22.

The stay 14 is a member that structures the leg portions of the headrest 12, and is held at a seat back 24. As shown in FIG. 2, this stay 14 has a pair, for example, of vertical bar portions 14V that extend toward the seat upper side, and a horizontal bar portion 14H that extends in the seat transverse direction so as to connect, for example, the upper ends of these vertical bar portions 14V. The stay 14 is fabricated by, for example, bending a round bar, and, as shown in FIG. 3, the cross-sections of the vertical bar portions 14V and the horizontal bar portion 14H are circular.

Figure 3:
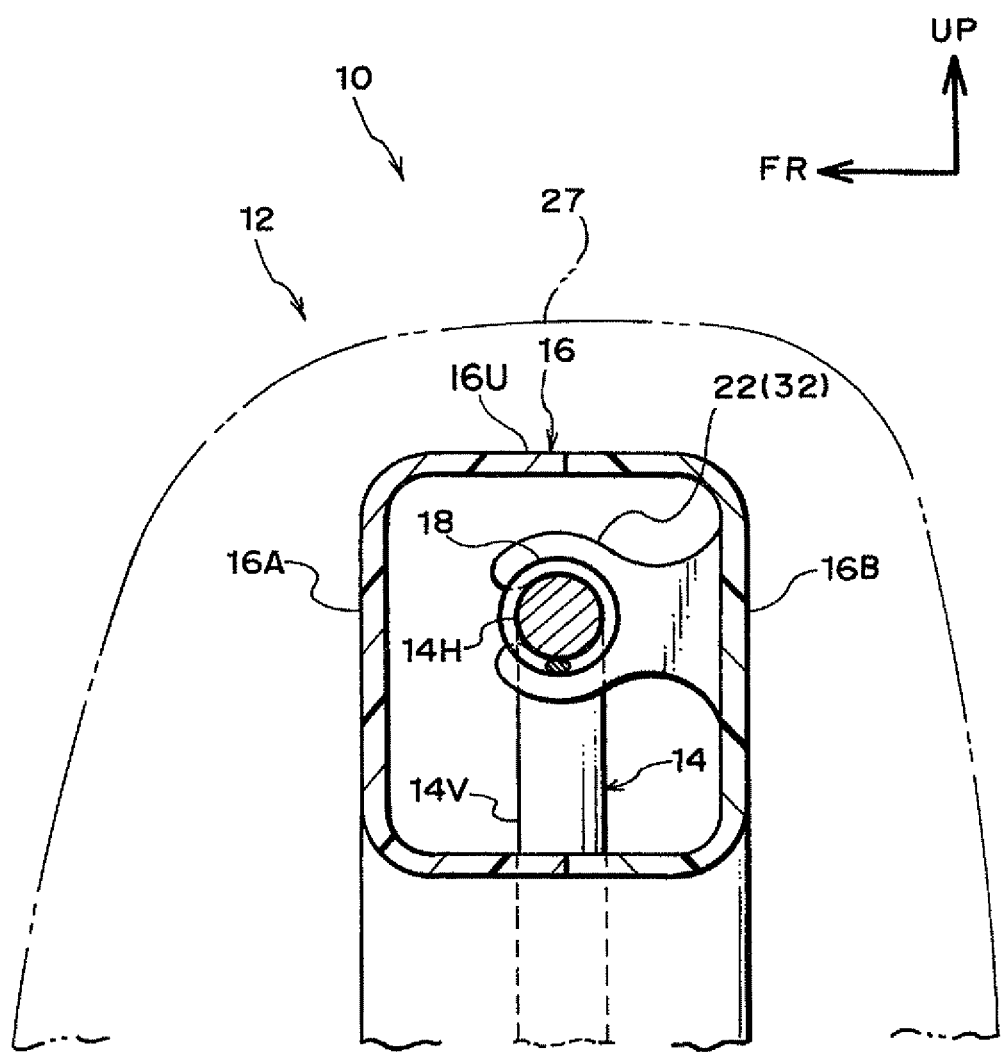

In FIG. 2 and FIG. 3, the cover 16 is, for example, a molded part of synthetic resin, and is supported at, for example, the horizontal bar portion 14H at the stay 14, and covers at least a portion of this stay 14, and is supported at this stay 14 so as to be able to swing in the seat front-rear direction around the seat transverse direction. As shown in FIG. 3, this cover 16 is divided in two into, for example, a front portion 16A that is positioned at the seat front side and a rear portion 16B that is positioned at the seat rear side, and is made integral by fitting or adhesion or the like in a state of being placed on the stay 14.

As shown in FIG. 2, the upper portions of the vertical bar portions 14V and the horizontal portion 14H at the stay 14 are entirely covered by the cover 16. The inner surface of the cover 16 at the front and rear of the vertical bar portions 14V is separated from these vertical bar portions 14V. This is in order to make it such that the cover 16 can swing in the seat front-rear direction around the horizontal bar portion 14H of the stay 14.

The lower portions of the vertical bar portions 14V extend further toward the seat lower side than the cover 16, and are inserted into the seat back 24. Due thereto, the headrest 12 is held at the seat back 24. A cushion 26 (FIG. 6), that is structured of a foamed resin or the like, is provided at the outer side of the cover 16, and this cushion 26 is covered by an outer skin 27.

In FIG. 2 and FIG. 3, the torsion coil spring 18 is interposed between the cover 16 and the stay 14, and is a member that, when the cover 16 swings, elastically deforms and generates restoring force in the direction opposing the swinging direction of this cover 16. In other words, this restoring force is force that attempts to return the cover 16 to a neutral state. The torsion coil spring 18 is disposed coaxially with the horizontal bar portion 14H of the stay 14, and one end of the torsion coil spring 18 is anchored or fixed to the cover 16 side, and the other end is anchored or fixed to the horizontal bar portion 14H side. In the present embodiment, mainly the coil portion at the torsion coil spring 18 generates the restoring force.

The suppressing portions 22 are provided between the stay 14 and the cover 16, and are regions that suppress displacement of the cover 16 other than in the swinging direction. These suppressing portions 22 are fit-together with the horizontal bar portion 14H, and also serve as supporting portions 32 of the cover 16 with respect to the stay 14.

Concretely, as shown in FIG. 3, the suppressing portions 22 are a pair of regions that are substantially C-shaped in cross-section and that are molded integrally with the rear portion 16B of the cover 16 so as to project-out toward the horizontal bar portion 14H side of the stay 14. The inner peripheral surfaces of the suppressing portions 22 are, in cross-section, shaped as circular arcs that run along the horizontal bar portion 14H of the stay 14.

(Operation)

The present embodiment is structured as described above, and operation thereof is described hereinafter. When the vehicle (not shown) is idling, vibrations are transmitted mainly from the engine to the vehicle seat 10, and, when the vehicle is traveling, vibrations are transmitted mainly from the road surface to the vehicle seat 10.

In FIG. 1 and FIG. 2, at the vehicle seat 10 relating to the present embodiment, the stay 14 of the headrest 12 is held at the seat back 24, and the cover 16, that covers at least a portion of this stay 14, is supported at the horizontal bar portion 141-1 of this stay 14 at the suppressing portions 22 (the supporting portions 32), and is swingable in the seat front-rear direction (arrow A direction and arrow B direction in FIG. 1) around the seat transverse direction. Concretely, due to the suppressing portions 22 being fit-together with the horizontal bar portion 14H, that has a circular cross-section, at the stay 14, the cover 16 can swing, with respect to the stay 14, in the seat front-rear direction around the horizontal bar portion 14H that extends in the seat transverse direction. Due thereto, the headrest 12 can swing in the seat front-rear direction around the seat transverse direction with respect to the stay 14.

Due to the torsion coil spring 18 elastically deforming at the time when the headrest 12 swings, restoring force is generated in the direction opposing the swinging direction of the cover 16 within this headrest 12. Concretely, when the cover 16 rotates toward the seat rear side, restoring force that attempts to return this cover 16 toward the seat front side (in the arrow A direction in FIG. 1) is generated. Further, when the cover 16 rotates toward the seat front side, restoring force that attempts to return this cover 16 toward the seat rear side (in the arrow B direction in FIG. 1) is generated.

Displacement, other than in the above-described swinging directions, of the cover 16 is suppressed by the suppressing portions 22. Concretely, due to the suppressing portions 22 being fit-together with the horizontal bar portion 14H of the stay 14, the cover 16 being displaced other than in the swinging directions toward the seat front-rear directions around the seat transverse direction, and concretely, the cover 16 vibrating around the seat vertical direction and the seat front-rear direction, is suppressed. Further, the cover 16 translating and vibrating in the seat vertical direction, the seat transverse direction and the seat front-rear direction with respect to the stay 14 also is suppressed.

In this way, in accordance with the present embodiment, the function of a dynamic damper that damps vibrations of the vehicle seat 10 can be imparted to the headrest 12, by a simple structure and while suppressing an increase in cost. Due thereto, at times when the vehicle is idling or at times when the vehicle is traveling, vibrations of the vehicle seat 10 are suppressed, and a reduction in abnormal sound and an improvement in the seating comfort can be devised. Further, due thereto, the product value of the vehicle can be increased.

Further, in accordance with the present embodiment, an impact absorbing function with respect to the head portion of a seated vehicle occupant can be imparted. Concretely, when the head portion of a seated vehicle occupant abuts the headrest 12 due to inertia at the time of a rear collision of the vehicle for example, the impact with respect to this head portion can be absorbed due to this headrest 12 swinging elastically with respect to the stay 14.

Moreover, in the present embodiment, because the suppressing portions 22 also serve as the supporting portions 32 of the cover 16 with respect to the stay 14, the structure becomes even more simple, and an increase in cost can be suppressed.

Note that, in the present embodiment, the suppressing portions 22 also serve as the supporting portions 32, but are not limited to this, and the suppressing portions 22 and the supporting portions 32 may be structured separately.

The cross-section of the horizontal bar portion 14H of the stay 14 is made to be circular, but there is no need for the entire periphery of the cross-section of this horizontal bar portion 14H to be circular-arc-shaped, and it suffices for the range, over which the suppressing portions 22 (the supporting portions 32) slide when the cover 16 swings, to be circular-arcshaped. Further, in FIG. 3, the suppressing portions 22 are formed at the rear portion 16B of the cover 16 so as to project-out toward the horizontal bar portion 14H side of the stay 14, but are not limited to this, and may be formed so as to, for example, project-out from a ceiling portion 16U of the cover 16 toward the horizontal bar portion 14H side (the seat lower side).

[Second Embodiment]

Figure 4:
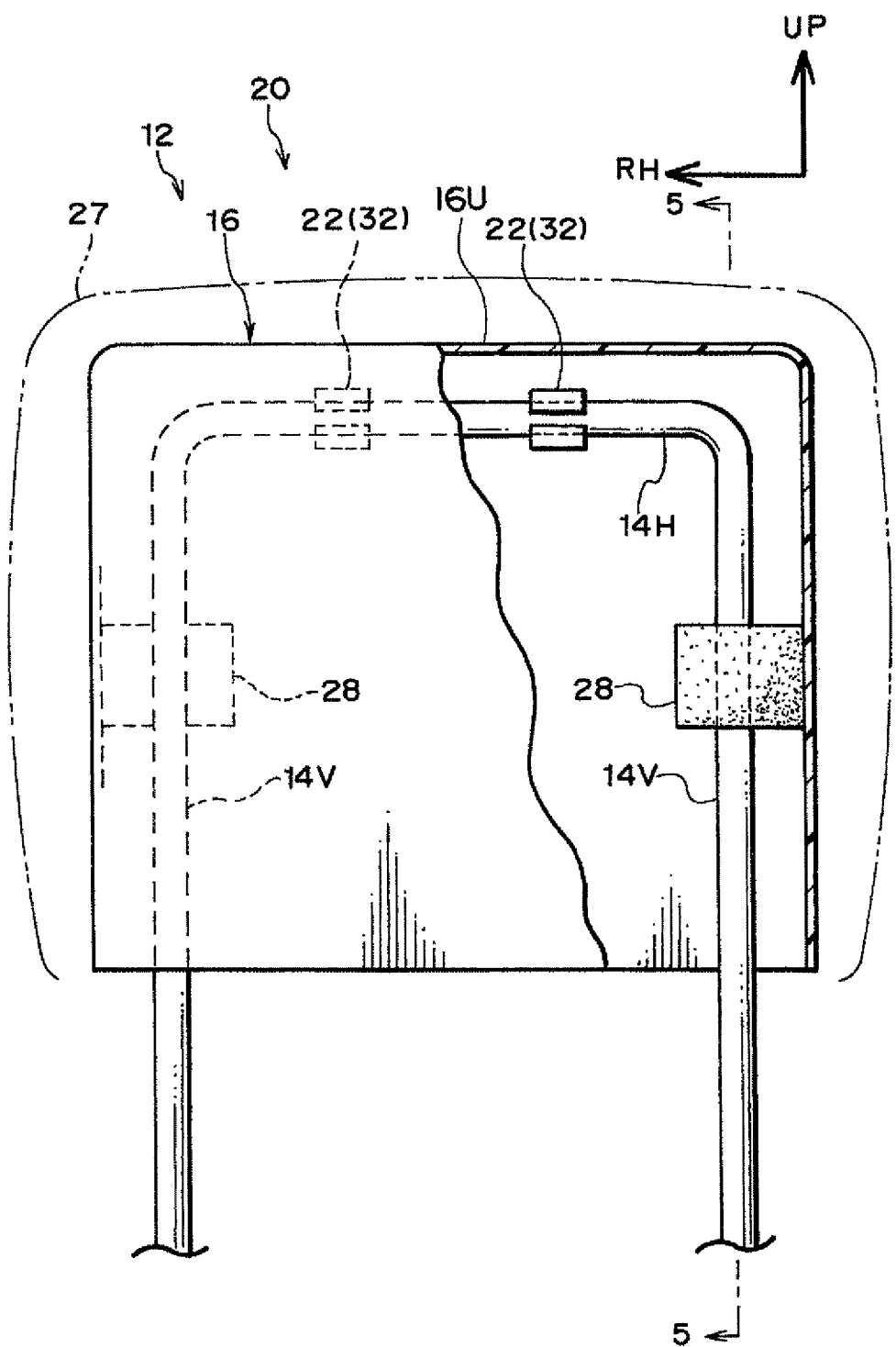
FIG. 4 and FIG. 5 relate to a second embodiment.
Figure 5:
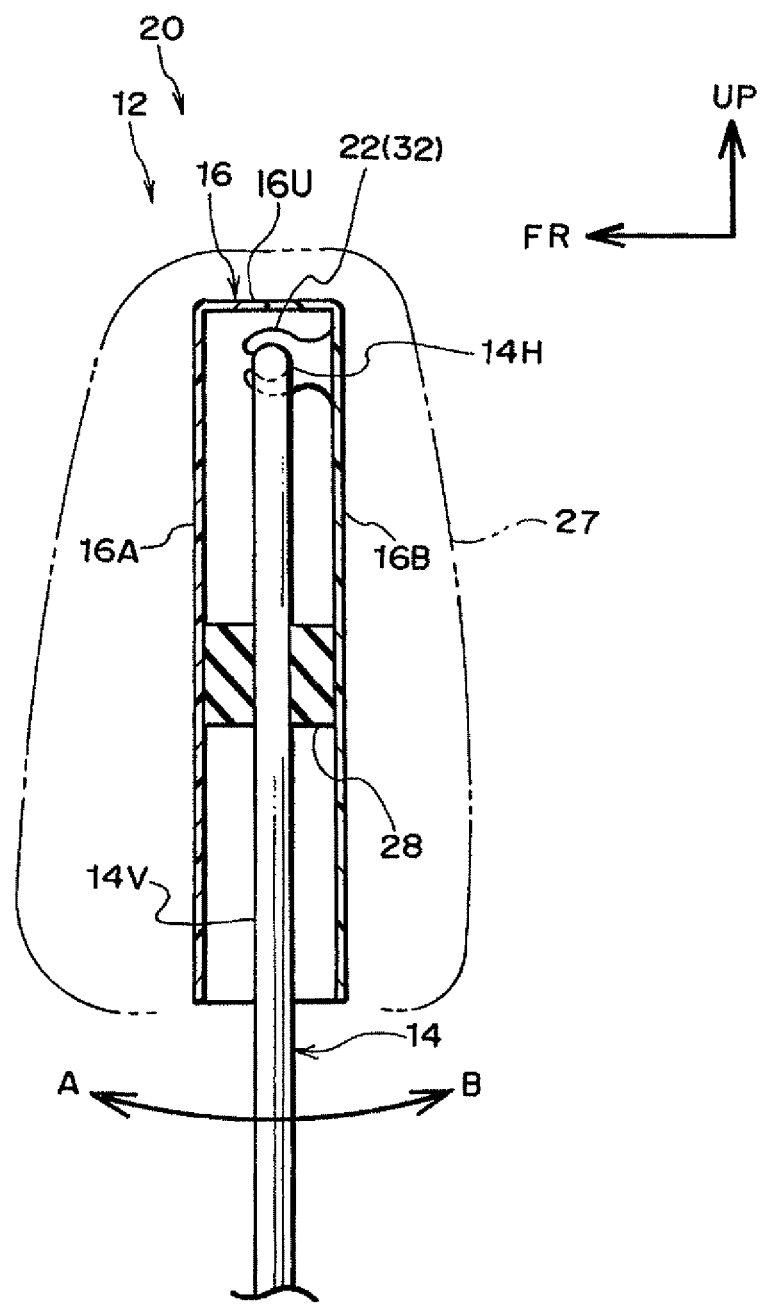

In FIG. 4 and FIG. 5, in a vehicle seat 20 relating to the present embodiment, foamed bodies 28 that are tubular and are examples of elastic members, are mounted by being fit-together with the vertical bar portions 14V of the stay 14 at the inner side of the cover 16. The resonance frequency of the headrest 12 as a dynamic damper is set by the mounting height of the foamed bodies 28.

Concretely, by setting the mounting height of the foamed bodies 28 to be low, it is difficult for the headrest 12 to swing with respect to the stay 14, and the resonance frequency can be set to be high. Further, by setting the mounting height of the foamed bodies 28 to be high, it is easy for the headrest 12 to swing with respect to the stay 14, and the resonance frequency can be set to be small.

The seat front sides of the foamed bodies 28 abut the inner surface of the front portion 16A at the cover 16, and the seat rear sides of the foamed bodies 28 abut the inner surface of the rear portion 16B at this cover 16. When the headrest 12 swings toward the vehicle rear side (in the arrow B direction) from the neutral state around the horizontal bar portion 14H of the stay 14, the portions, between the vertical bar portions 14V and the front portion 16A of the cover 16, of the foamed bodies 28 compressively deform elastically. Due thereto, restoring force that attempts to return the headrest 12 to the neutral state in the arrow A direction is generated. In other words, of the foamed bodies 28, the deformed portions between the vertical bar portions 14V and the front portion 16A of the cover 16 generate the restoring force. This is the same also in a case in which, for example, at the time of a rear collision of the vehicle, the head portion of a seated vehicle occupant abuts the headrest 12 due to inertia and this headrest 12 swings in the arrow B direction.

On the other hand, when the headrest 12 swings toward the vehicle front side (in the arrow A direction) from the neutral state around the horizontal bar portion 14H of the stay 14, the portions, between the vertical bar portions 14V and the rear portion 16B of the cover 16, of the foamed bodies 28 compressively deform elastically. Due thereto, restoring force that attempts to return the headrest 12 to the neutral state in the arrow B direction is generated.

In this way, in accordance with the present embodiment, by a simple structure, the function of a dynamic damper that damps vibrations of the vehicle seat 20 is imparted to the headrest 12, and an impact absorbing function with respect to the head portion of a seated vehicle occupant can be imparted.

Note that the foamed bodies 28 are not limited to tubular bodies that are inserted into the vertical bar portions 14V of the stay 14, and the foamed bodies 28, that are respectively block-shaped for example, may be provided between the front portion 16A of the cover 16 and the vertical bar portions 14V, and between the rear portion 16B of this cover 16 and the vertical bar portions 14V. Further, the number of places at which the foamed body 28 is set with respect to the one vertical bar portion 14V is not limited to one place, and the foamed bodies 28 may be provided at plural places. Moreover, instead of the foamed bodies 28, various types of elastic bodies, such as rubber or compression coil springs or plate springs or the like, may be used.

Because the other portions are similar to the first embodiment, the same portions are denoted by the same reference numerals in the drawings, and description thereof is omitted.

[Third Embodiment]

Figure 6:
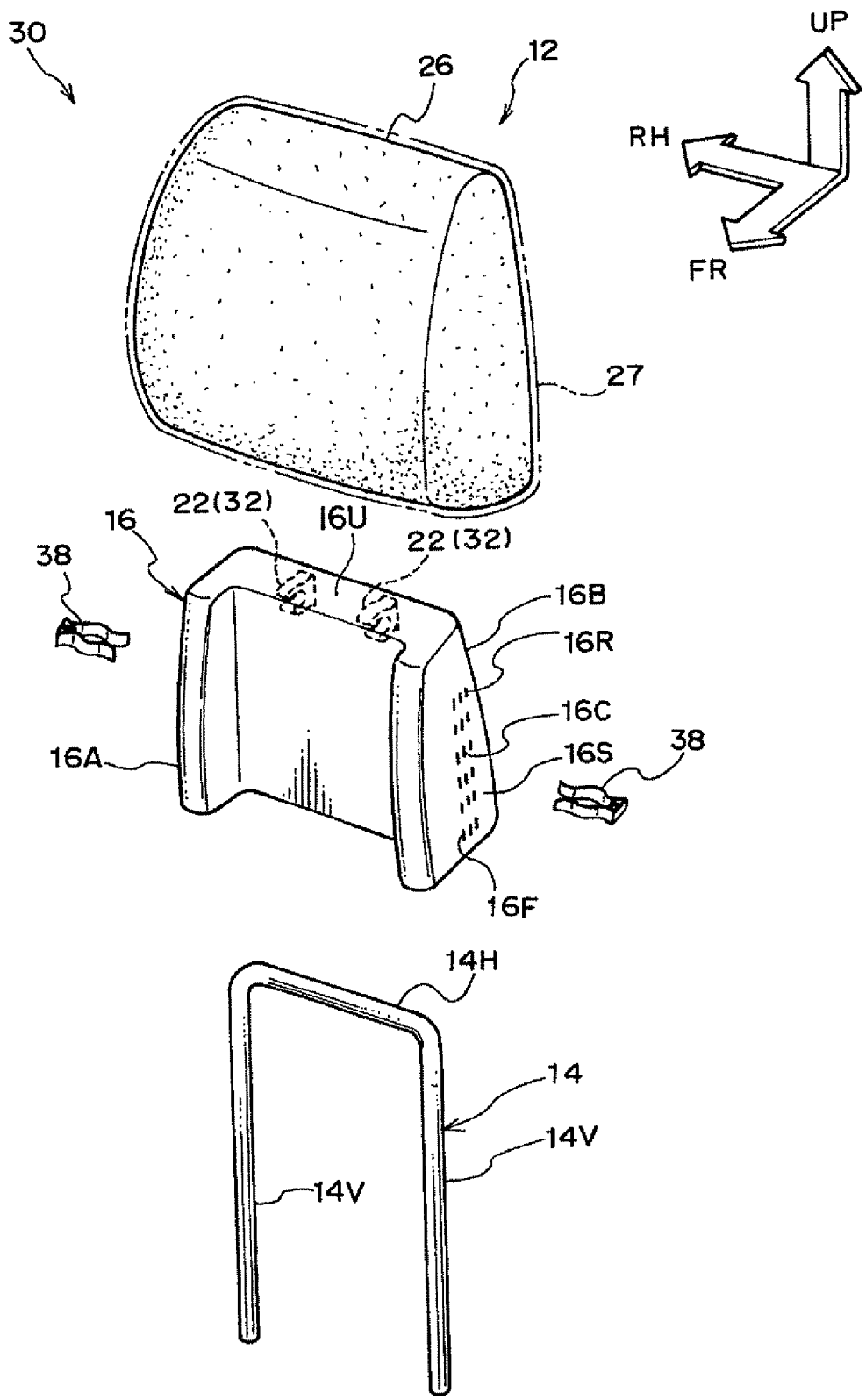
FIG. 6 through FIG. 13 relate to a third embodiment.
Figure 7:
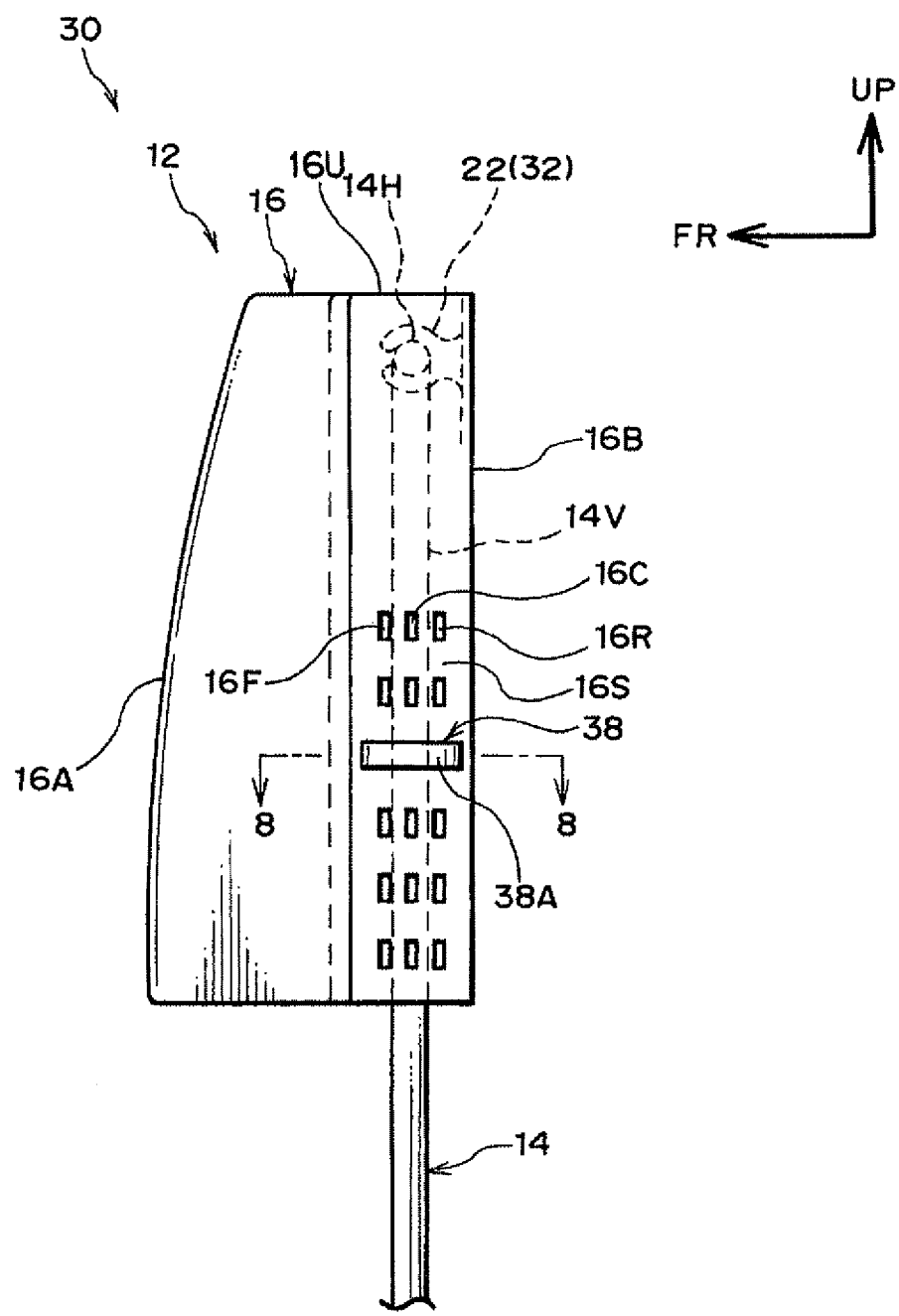
Figure 8:
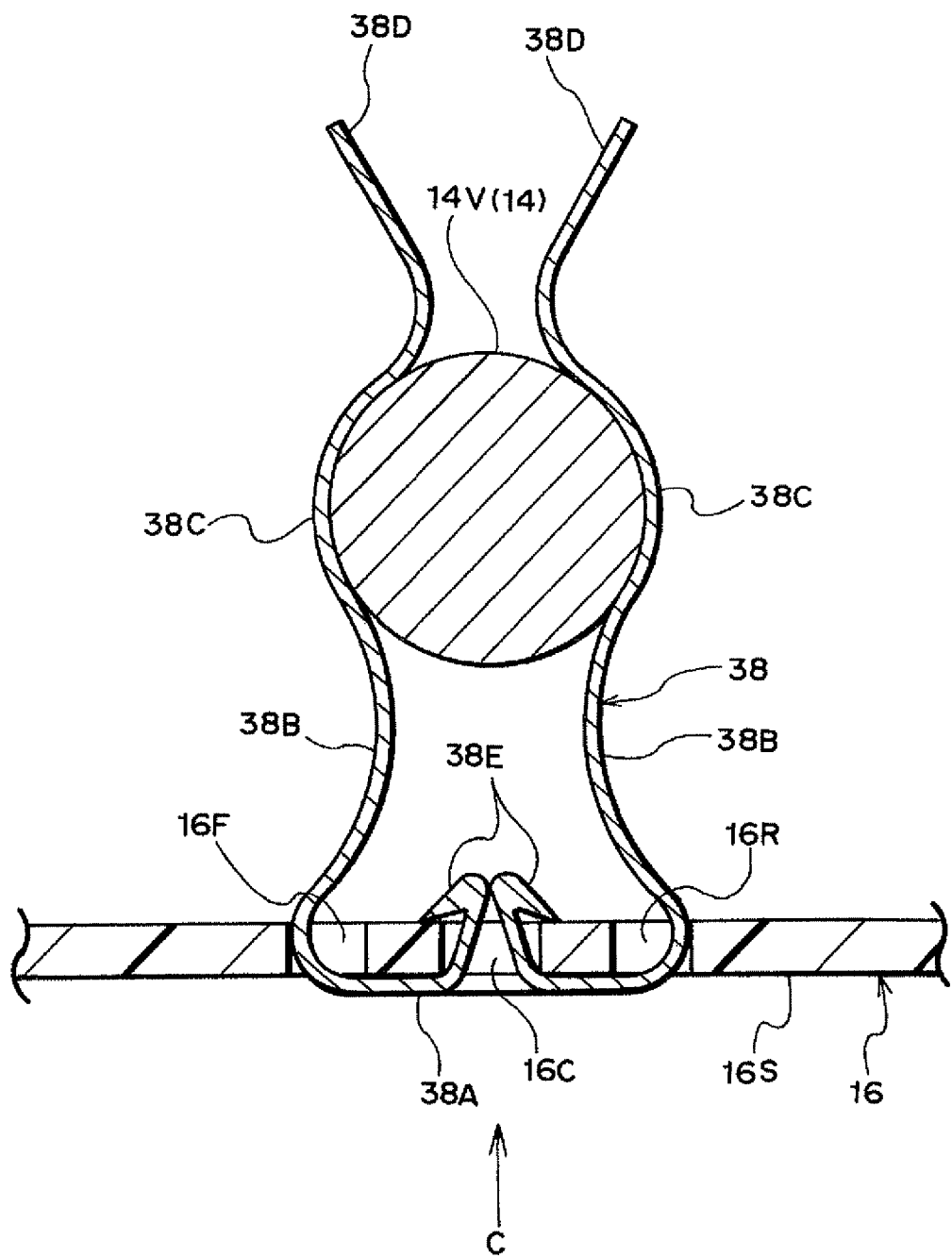

In FIG. 6 through FIG. 8, in a vehicle seat 30 relating to the present embodiment, clips 38, that are examples of elastic members, are fixed to the cover 16, and are fit-together with the vertical bar portions 14V so as to elastically deform when the cover 16 swings in the seat front-rear direction.

As shown in FIG. 6 and FIG. 8, the clip 38 is a part formed by bending-molding a thin-plate-shaped spring steel for example, and is passed-through openings 16F, 16C, 16R that are provided in a side portion 16S of the cover 16, and is inserted into the vertical bar portion 14V side. The openings 16F, 16C, 16R are arrayed in parallel along the seat front-rear direction, and are pass-through holes at which insertion of the clip 38 is possible. The opening 16F is positioned furthest toward the seat front side, the opening 16R is positioned furthest toward the seat rear side, and the opening 16C is positioned between the openings 16F, 16R.

A plurality of the openings 16F, 16C, 16R are arrayed in the seat vertical direction. The set of the openings 16F, 16C, 16R at each height position is a mounting position for each clip 38, and the mounting height of the clip 38 can be selected appropriately. Note that, in a case in which the mounting height of the clip 38 is decided, the openings 16F, 16C, 16R may be provided at that height position only, Further, the openings 16F, 16C, 16R may each be structured by a slit-shaped long hole that extends in the seat vertical direction, such that the mounting height of the clip 38 can be selected in a non-stepped manner.

Figure 9:
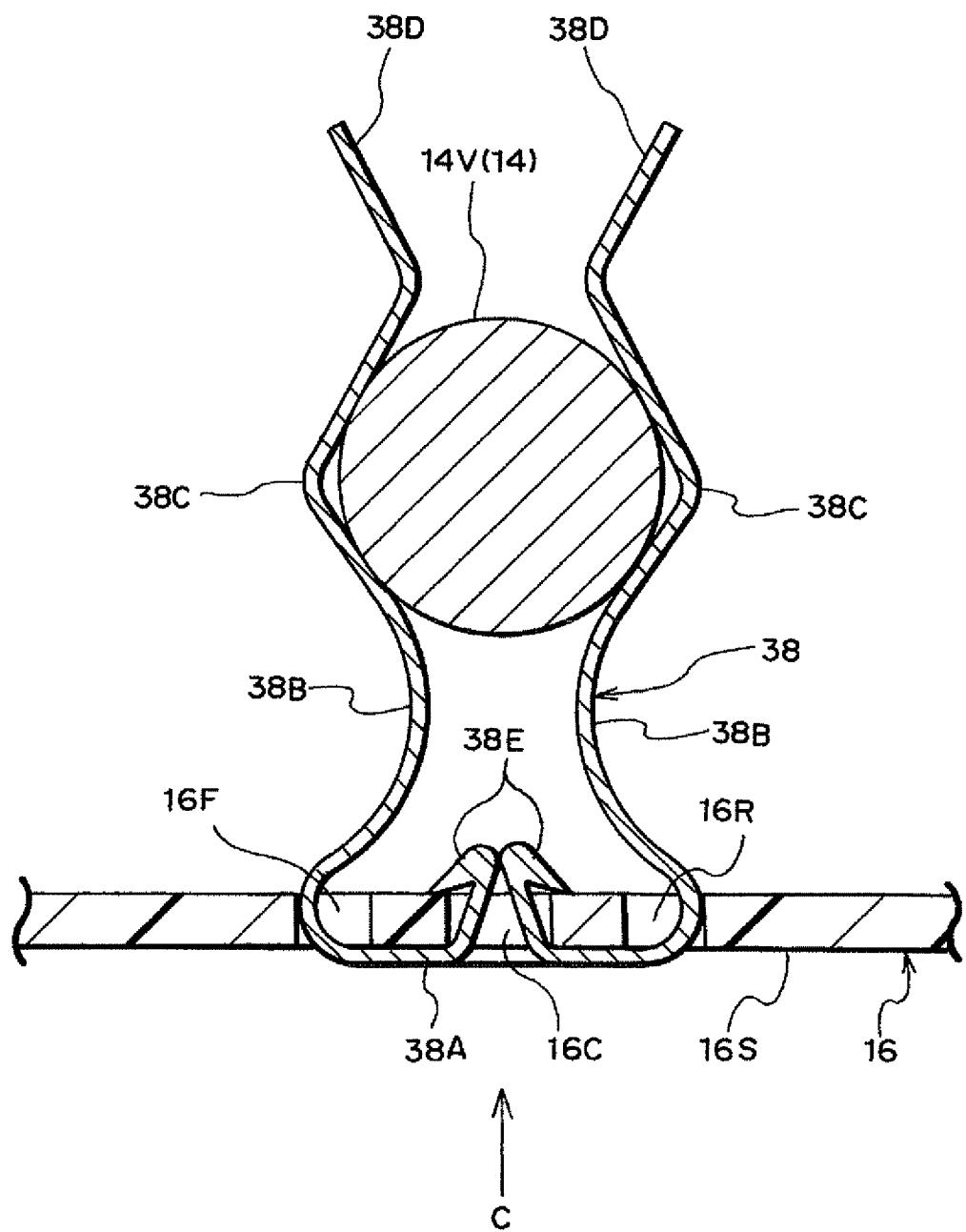

As shown in FIG. 8, the clip 38 has a base portion 38A that runs along the side portion 16S of the cover 16, and a pair of arm portions 38B that are formed by bending from the both ends of the base portion 38A and that face one another. One of the arm portions 38B is inserted into the opening 16F at the seat front side, and the other arm portion 38B is inserted into the opening 16R at the seat rear side. The pair of arm portions 38B have a pair of fit-together portions 38C that fit-together with the vertical bar portion 14V of the stay 14 so as to nip this vertical bar portion 14V. The cross-sectional shapes of the fit-together portions 38C are, for example, circular-arc-shaped, and the fit-together portions 38C abut the outer peripheral surface of the vertical bar portion 14V so as to follow therealong. Note that, as shown in FIG. 9, the cross-sectional shapes of the fit-together portions 38C may be L-shaped or the like. In this case, the fit-together portions 38C each abut the outer peripheral surface of the vertical bar portion 14V at two points in the cross-section of FIG. 9.

The diameter (not shown) of the circle that is inscribed by the pair of fit-together portions 38C is set to be smaller than the diameter of the vertical bar portion 14V, in the natural state of the clip 38. Further, the separation distance of the pair of fit-together portions 38C is partially narrowed at the front and the rear of the fit-together portions 38C, and the fit-together portions 38C stably fit-together with the vertical bar portion 14V. The vertical bar portion 14V is supported elastically in the seat front-rear direction by these fit-together portions 38C. When the cover 16 swings, the arm portions 38B, that have the fit-together portions 38C, of the clips 38 generate restoring force in the direction opposing the swinging direction of the cover 16.

At the time of mounting the clip 38 to the cover 16, end portions 38D of the pair of arm portions 38B spread toward the distal ends of these end portions 38D and become the final ends, so that the vertical bar portion 14V smoothly enters-in between this pair of arm portions 38B. Note that the shape of the arm portions 38B at the clip 38 is not limited to this, and may be a simple flat plate shape.

Engaging portions 38E, that engage with peripheral edge portions of the opening 16C for example at the cover 16 at the time of completion of insertion into the openings 16F, 16R, are provided at the base portion 38A of the clip 38. These engaging portions 38E are a pair of claws for example, and are formed by portions of the base portion 3 8A being cut and raised in the direction in which the arm portions 38B extend. Note that the engaging portions 38E are not limited to a pair of claws, and may be any structure provided that they can engage with the cover 16. Further, the clips 38 may be structures that are fixed to the cover 16 due to the arm portions 38B fitting-together with or engaging with the openings 16F, 16R, without using the engaging portions 38E. In this case, there is no need to provide the openings 16C at the side portions 16S of the cover 16.

Figure 10:
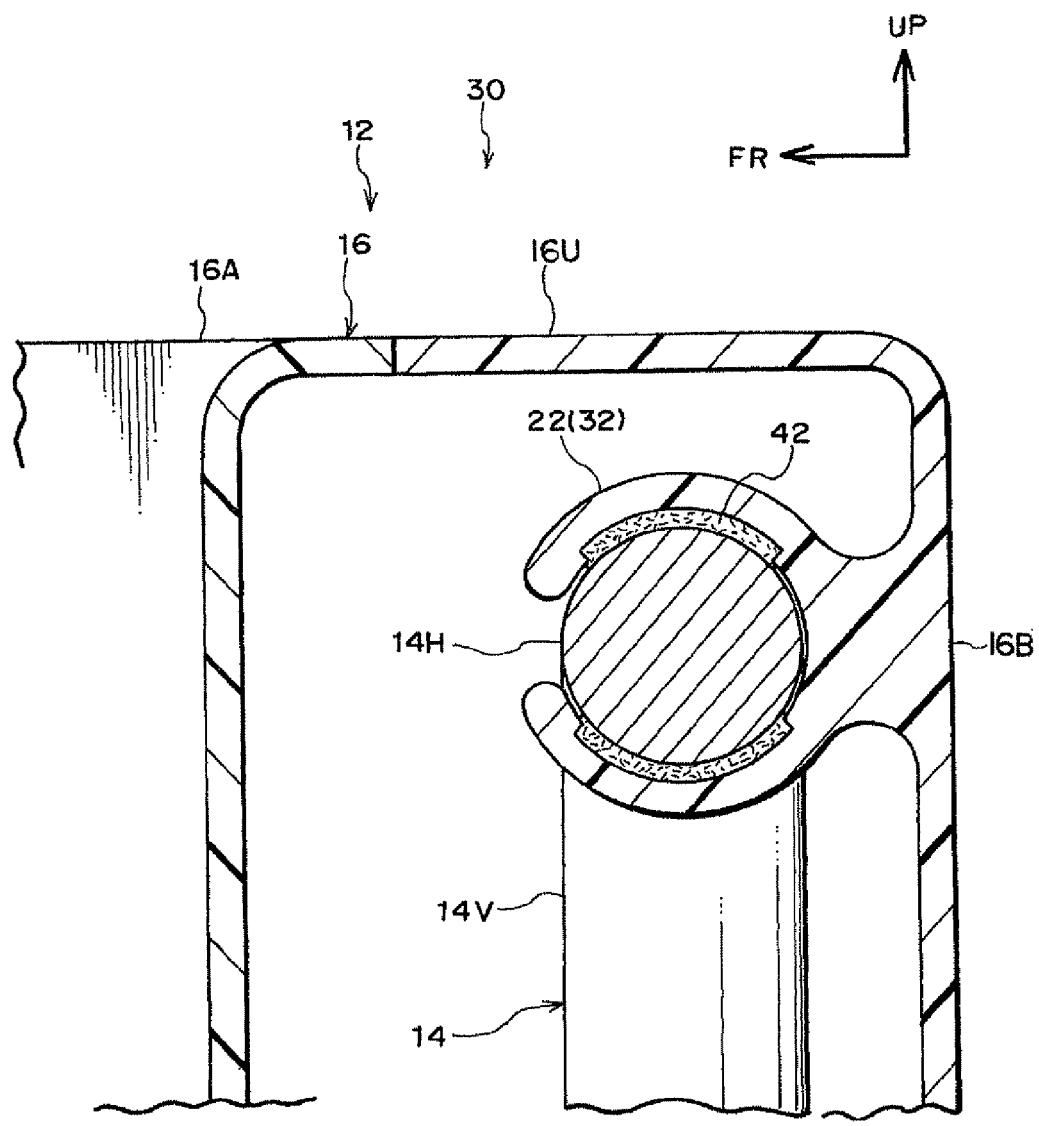

As shown in FIG. 10, felt 42 for example may be provided at the inner peripheral surface of the suppressing portion 22. This is because, by interposing the felt 42 that is relatively flexible between the horizontal bar portion 14H of the stay 14 and the suppressing portion 22, the coefficient of friction is reduced, swinging of the headrest 12 is made to be smooth, and generation of abnormal sound can be suppressed. Note that this felt 42 can also be applied to the other embodiments.

Note that the structure of the present embodiment is symmetrical at the left and the right, and therefore, only the structure at one side is explained from FIG. 7 through FIG. 10. However, the structure of the present embodiment is not limited to the same, and may be asymmetrical to the left and the right. Because the other portions are similar to the first embodiment, the same portions are denoted by the same reference numerals in the drawings, and description thereof is omitted.

(Operation)

Figure 11:
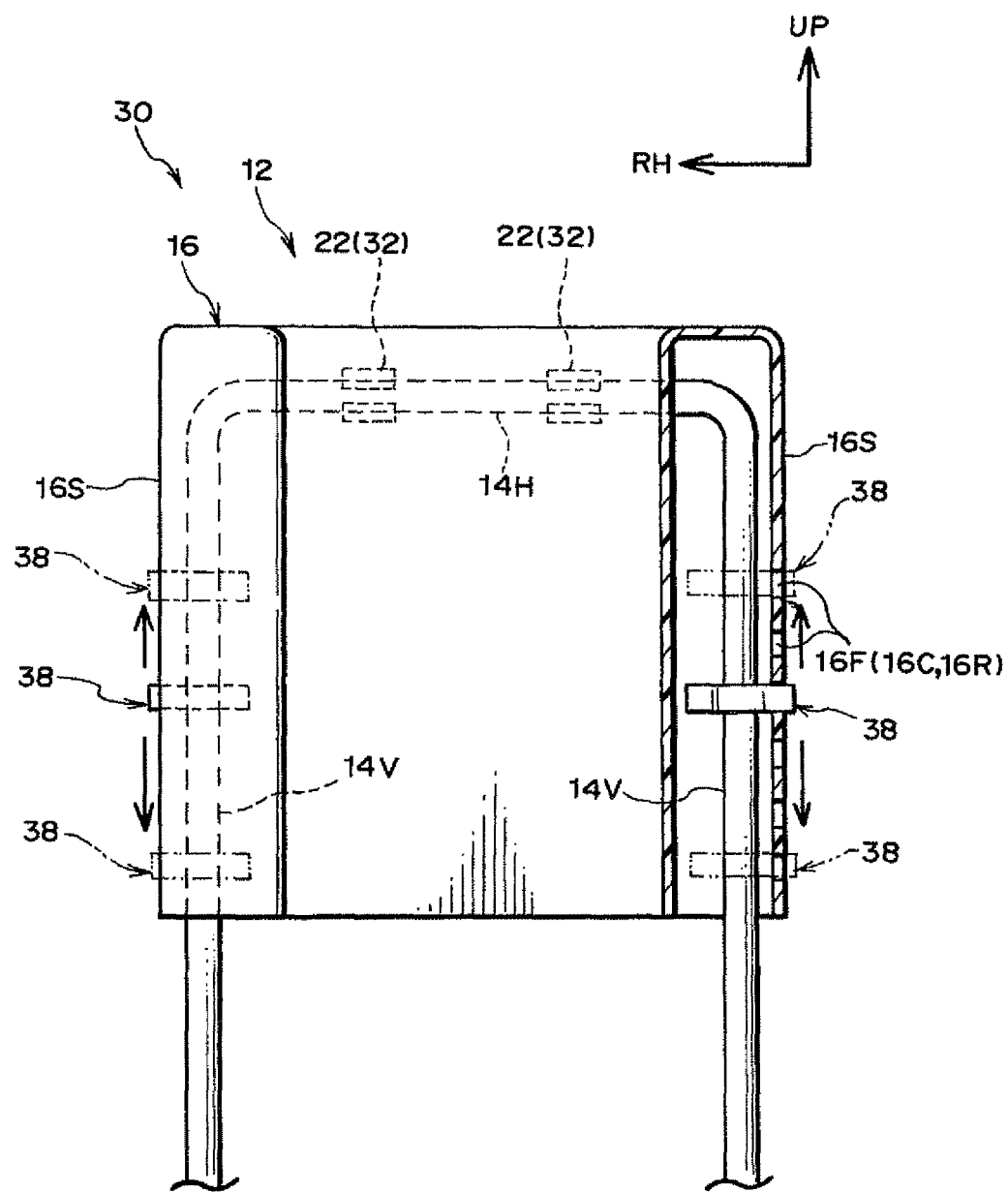

The present embodiment is structured as described above, and operation thereof is described hereinafter. In FIG. 11, at the vehicle seat 30 relating to the present embodiment, the clips 38 are structures that are passed through the openings 16F, 16C, 16R that are provided in the side portions 16S of the cover 16, and are inserted into the vertical bar portion 14V sides. Therefore, the workability at the time of mounting the clips 38 is good as compared with a case of mounting the torsion coil spring 18 to the horizontal bar portion 14H as in the first embodiment. Further, because the engaging portions 38E engage with the peripheral edge portions of the openings 16C at the cover 16 when insertion of the clips 38 is completed, the workability at the time of mounting the clips 38 is even better.

Because a plurality of the openings 16F, 16C, 16R at the side portions 16S of the cover 16 are provided in the seat vertical direction, the height position at which the clips 38 are inserted can be selected appropriately. Due to the specifications of the vehicle seat 30 and the like, there are various resonance frequencies of the seat main body, in which the headrest 12 is removed from the vehicle seat 30, and the resonance frequency of the headrest 12 can easily be tuned in accordance therewith.

Concretely, by setting the height positions of the clips 38 to be low, it is made difficult for the headrest 12 to swing with respect to the stay 14, and the resonance frequency can be set to be high. Further, by setting the height position of the clips 38 to be high, it is made easy for the headrest 12 to swing with respect to the stay 14, and the resonance frequency can be set to be low. At this time, because various resonance frequencies can be set by using parts that are common, there is no increase in mass or cost.

In a case in which the openings 16F, 16C, 16R are each structured by a slit-shaped long hole that extends in the seat vertical direction, the mounting height of the clips 38 can be selected in a non-stepped manner.

Because the clips 38 are fixed to the cover 16 and are fit-together with the vertical bar portions 14V of the stay 14, when the headrest 12 swings, the clips 38 swing together with the cover 16 while still abutting the vertical bar portions 14V, and elastically deform due to the relative displacement between the clips 38 and these vertical bar portions 14V. Therefore, the generation of abnormal sound between the clips 38 and the vertical bar portions 14V is suppressed, and the product value can be increased.

Note that, in the present embodiment, the clips 38 are inserted into the vertical bar portion 14V sides of the stay 14, i.e., toward the seat transverse direction inner side, from the openings 16F, 16C, 16R that are provided in the side portions 16S of the cover 16. However, the direction of insertion of the clips 38 is not limited to this, and, for example, the clips 38 may be inserted-in from the front portion 16A side toward the seat rear side, or may be inserted-in from the rear portion 16B side toward the seat front side. Members that are similar to the clips 38 may be fit-together with the horizontal portion 14H of the stay 14 as the suppressing portions 22 (the supporting portions 32).

Modified Example

In the example shown in FIG. 11, the stay 14 is a structure in which the upper ends of the pair of vertical bar portions 14V are connected in the seat transverse direction by the horizontal bar portion 14H, and this horizontal bar portion 14H is fit-together with the suppressing portions 22 (the supporting portions 32) of the cover 16, but the stay 14 is not limited to this. For example, as shown in FIG. 12 and FIG. 13, the stay 14 may be structured only by the pair of vertical bar portions 14V.

Figure 12:
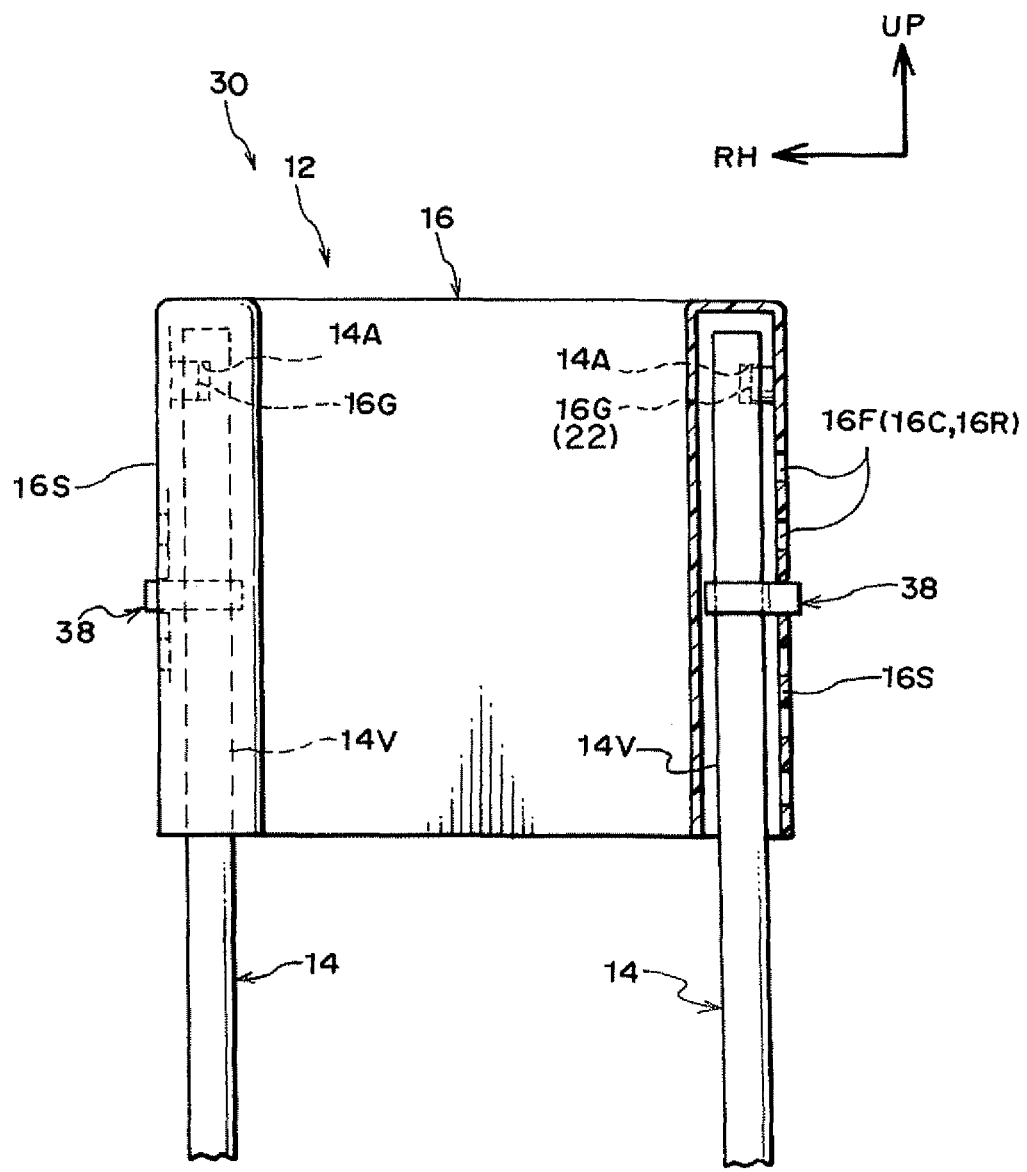
Figure 13:
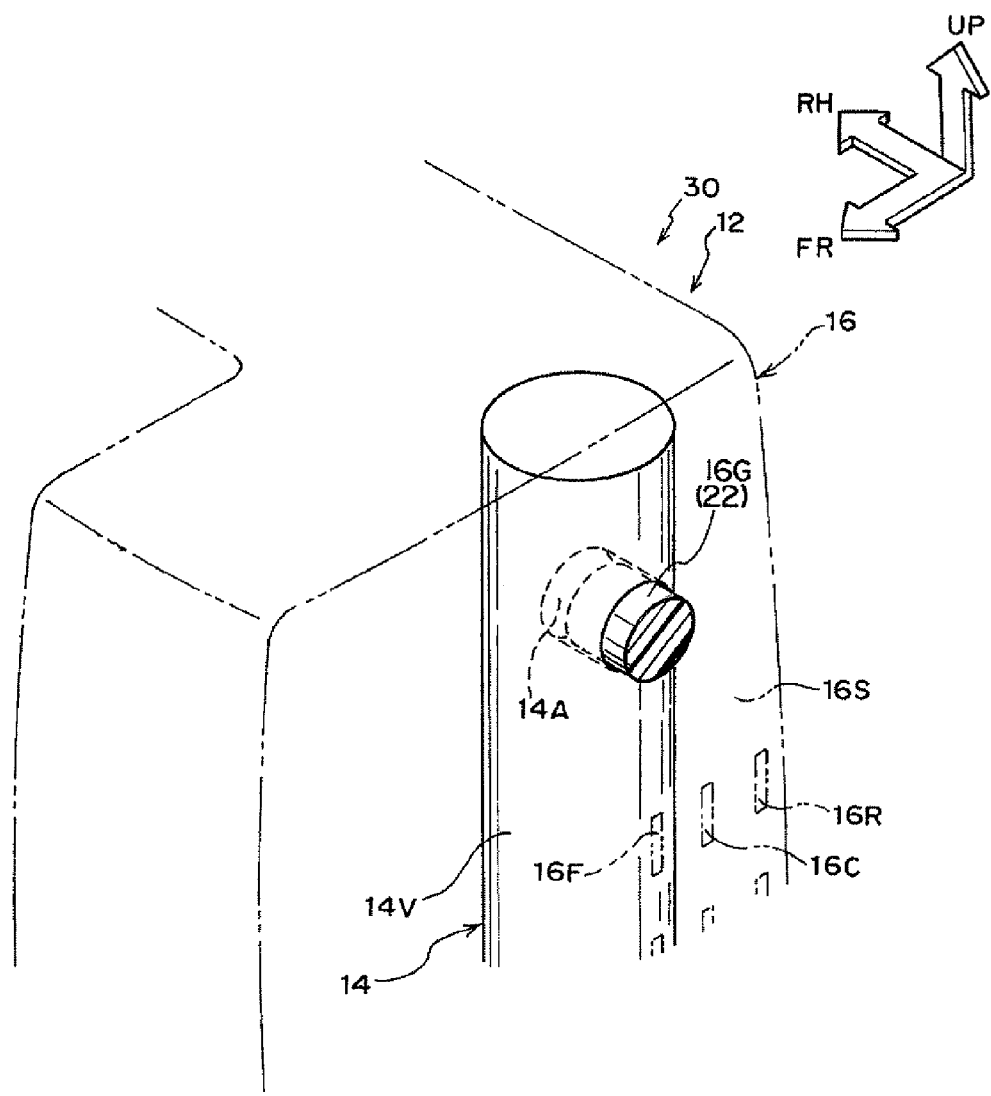

In the example shown in FIG. 12 and FIG. 13, shaft portions 16G, that are circular in cross-section for example, are provided at the inner surfaces of the side portions 16S of the both sides at the cover 16. On the other hand, recess portions 14A, that are circular in cross-section and correspond to the shaft portions 16G, are respectively provided in the seat transverse direction outer sides of the upper ends of the vertical bar portions 14V at the stay 14. Further, by inserting the shaft portions 16G into the recess portions 14A, the cover 16 is supported at the stay 14. Due thereto, the cover 16 can swing in the seat front-rear direction with respect to the stay 14 around the shaft portions 16G.

Opposite thereto, the recess portions 14A, that are circular in cross-section for example, may be provided respectively in the seat transverse direction inner sides of the upper ends of the vertical bar portions 14V at the stay 14, and the shaft portions 16G, that are circular in cross-section and correspond to the recess portions 14A, may be provided in the surfaces, that face these recess portions 14A, at the cover 16. Note that, in the modified example shown in FIG. 12 and FIG. 13, the shaft portions 16G also serve as the suppressing portions 22.

Note that these modified examples can be implemented by being combined appropriately. Namely, the recess portions 14A may be provided coaxially in the seat transverse direction outer sides and inner sides of the upper ends of the vertical bar portions 14V at the stay 14, and the shaft portions 16G may respectively be provided at surfaces, that oppose these recess portions 14A, at the cover 16. This is because the cover 16 can be supported more stably at the stay 14 due to the shaft portions 16G being inserted into one of the vertical bar portions 14V from the seat transverse direction both sides.

[Fourth Embodiment]

Figure 14:
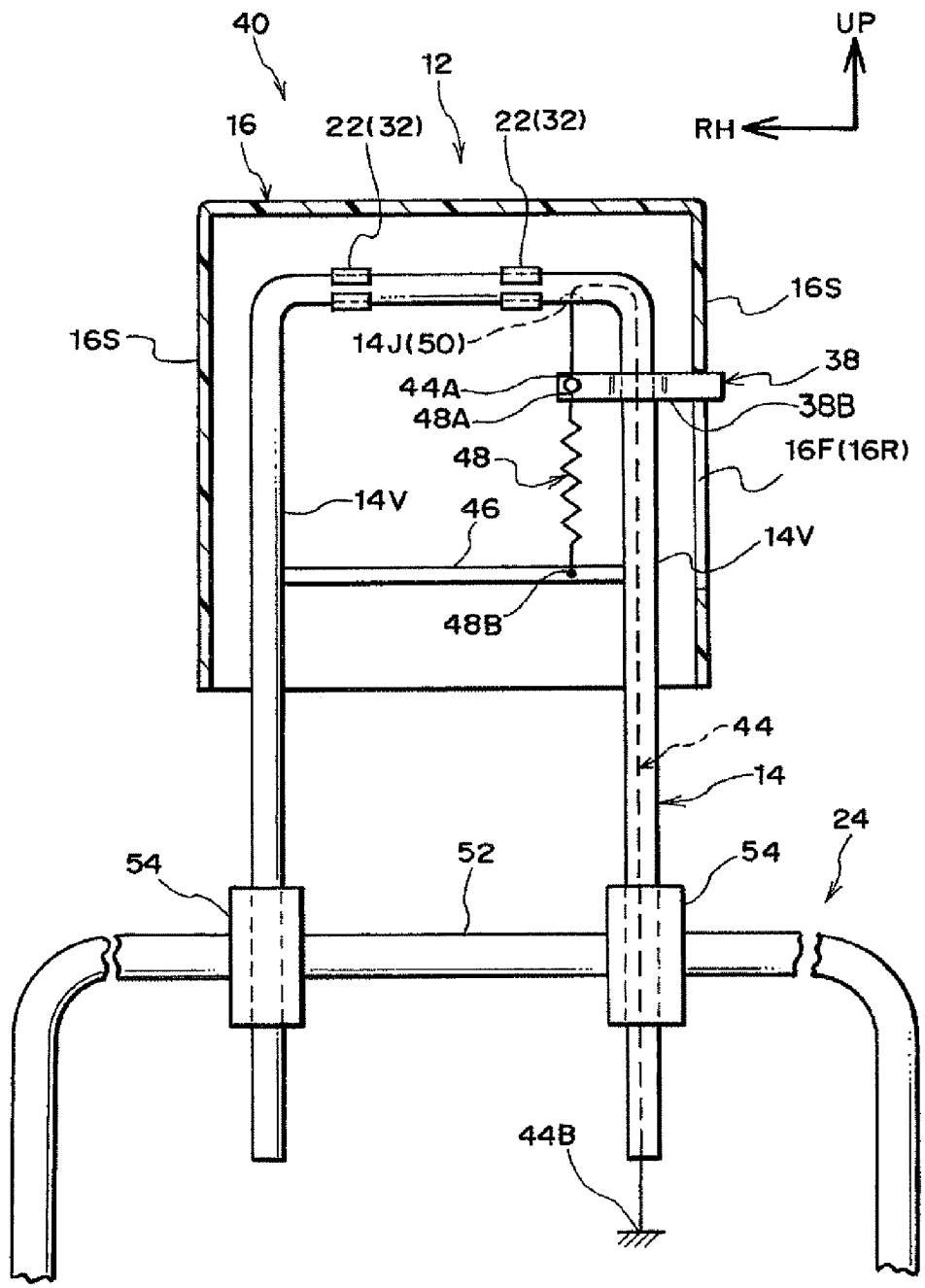
FIG. 14 and FIG. 15 relate to a fourth embodiment.
Figure 15:
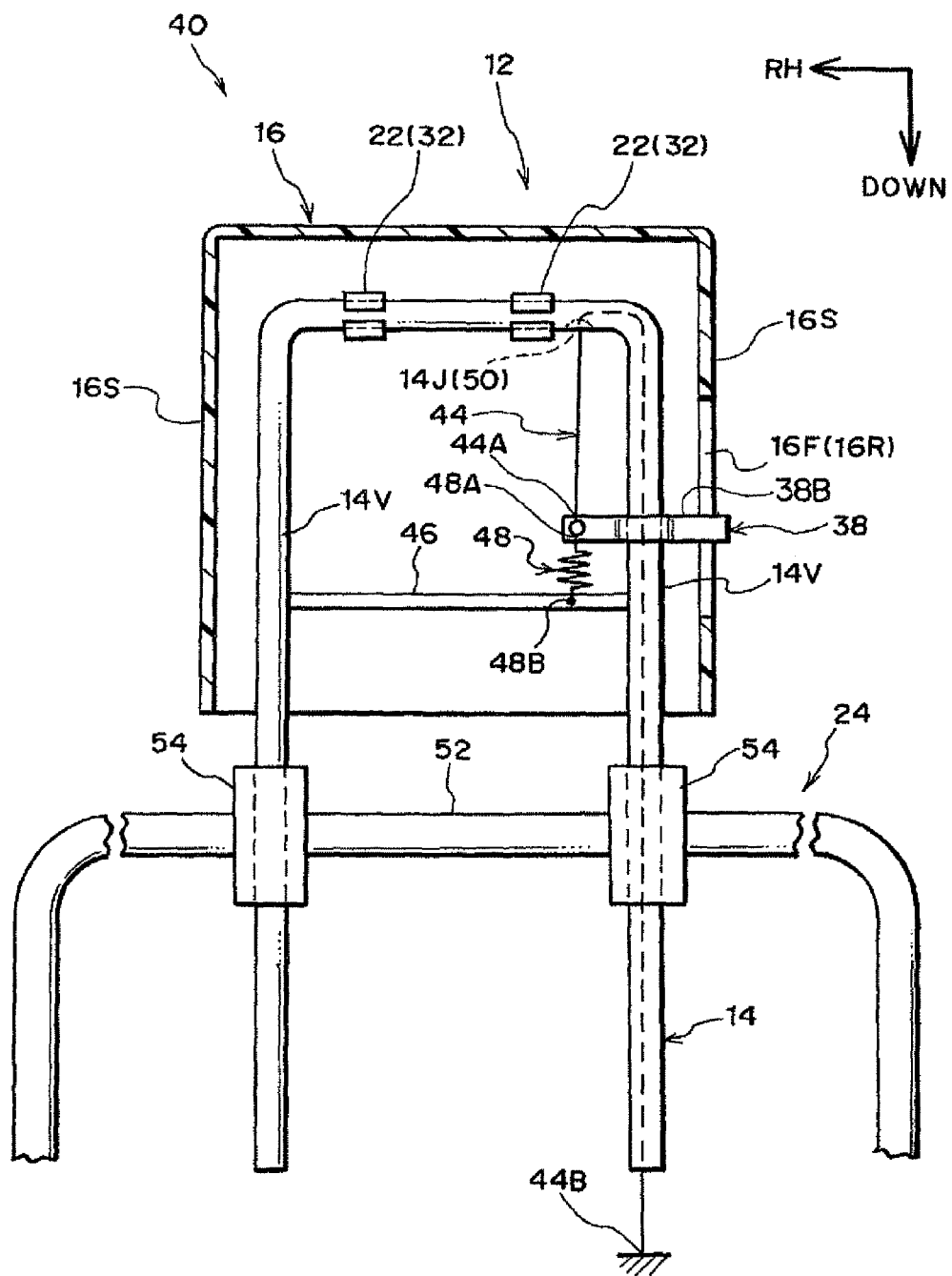

In FIG. 14 and FIG. 15, a vehicle seat 40 relating to the present embodiment has a tension coil spring 48 that is an example of a second elastic member, and a rope 44.

The tension coil spring 48 can extend and contract in the seat vertical direction, and an upper end 48A is connected to the clip 38 side, and a lower end 48B is connected to the stay 14, further toward the seat lower side than the clip 38. In the range that is covered by the cover 16, the pair of vertical bar portions 14V are connected in the seat transverse direction by a connecting member 46, and the lower end 48B of the tension coil spring 48 is connected to this connecting member 46. This tension coil spring 48 is disposed parallel to the vertical bar portions 14V for example.

One end 44B side of the rope 44 is connected to the seat back 24 side, and another end 44A side of the rope 44 is connected to the clip 38. This rope 44 extends from the one end 44B side toward the seat upper side, and inverts at a guide portion 50 that is further toward the seat upper side than the clip 38, and extends toward the seat lower side and arrives at the other end 44A. Concretely, the stay 14 is hollow, and the rope 44 is passed-through from the lower end of the vertical bar portion 14V at the stay 14 through the interior of this vertical bar portion 14V, and goes via the interior of the horizontal bar portion 14H, and, from a through-hole 14J that is provided at the seat lower side of this horizontal bar portion 14H, extends-out toward the outer side of the stay 14. This through-hole 14J is the guide portion 50. Note that the seat back 24 side, to which the one end 44B side of the rope 44 is connected, is not limited to the seat back 24, and includes a seat cushion (not shown) and the like.

Differently than the third embodiment, the clip 38 is not fixed to the cover 16.

When the headrest 12 moves upward, due to the distance from the guide portion 50 to the other end 44A of the rope 44 decreasing, the clip 38 is pulled by the rope 44 and moves upward in the axial direction of the vertical bar portion 14V (toward the seat upper side). At this time, the tension coil spring 48 is pulled and stretched in accordance with the amount of decrease in the distance from the guide portion 50 to the other end 44A of the rope 44. On the other hand, when the headrest 12 moves downward, the clip 38 is pulled by the urging force of the tension coil spring 48, that has been pulled and stretched, and moves downward in the axial direction of the vertical bar portion 14V (toward the seat lower side). In the present embodiment as well, in the same way as in the third embodiment, when the cover swings, the arm portions 38B of the clip 38 generate restoring force in the direction opposing the swinging direction of this cover 16.

At the side portion 16S of the cover 16, the openings 16F, 16R are structured as long holes that are slit-shaped and extend in the seat vertical direction. Accompanying the vertical movement of the headrest 12, the clip 38 can slide in the seat vertical direction along these openings 16F, 16R. At this time, the clip 38 slides also with respect to the vertical bar portion 14V of the stay 14.

Note that the vertical bar portions 14V of the stay 14 are held at holding portions 54 of a seat back frame 52 that is the skeleton of the seat back 24.

Because the other portions are similar to the first embodiment or the third embodiment, the same portions are denoted by the same reference numerals in the drawings, and description thereof is omitted.

(Operation)

The present embodiment is structured as described above, and operation thereof is described hereinafter. In FIG. 14, at the vehicle seat 40 relating to the present embodiment, at the time of adjusting the height of the headrest 12, when this headrest 12 is moved upward in an arrow UP direction, the clip 38 is pulled by the rope 44 and moves toward the seat upper side. At this time, the tension coil spring 48 is pulled and stretched. Due to the clip 38 moving upward, the resonance frequency of the headrest 12 as a dynamic damper becomes lower.

When the height position of the headrest 12 is raised, the resonance frequency of the vehicle seat 40 becomes lower, but vibrations of the vehicle seat 40 can be damped appropriately by lowering the resonance frequency of the headrest 12 as a dynamic damper in accordance therewith.

Further, at the time of adjusting the height of the headrest 12, when this headrest 12 is moved downward in an arrow DOWN direction, the clip 38 is pulled by the urging force of the tension coil spring 48 and moves downward in the axial direction of the vertical bar portion 14V. Due thereto, the resonance frequency of the headrest 12 as a dynamic damper becomes higher.

When the height position of the headrest 12 is lowered, the resonance frequency of the vehicle seat 40 becomes higher, but vibrations of the vehicle seat 40 can be damped appropriately by raising the resonance frequency of the headrest 12 as a dynamic damper in accordance therewith.

In this way, at the vehicle seat 40 relating to the present embodiment, the resonance frequency as a dynamic damper can be changed appropriately in accordance with the height adjustment of the headrest 12.

Note that, in FIG. 14 and FIG. 15, the clip 38, the tension coil spring 48 and the rope 44 are provided at the one vertical bar portion 14V, but are not limited to this, and the clips 38, the tension coil springs 48 and the ropes 44 may be provided at the vertical bar portions 14V at the both sides. Further, although the tension coil spring 48 is given as an example of the second elastic member, it is not limited to this, and any structure may be used provided that it is an elastic member that can urge the clip 38 in the same way as this tension coil spring 48. Moreover, although the rope 44 is passed-through the interior of the stay 14, it is not limited to this, and it suffices for the rope 44 to be structured so as to extend toward the seat upper side from the one end 44B side that is connected to the seat back 24 side, and invert at the guide portion 50 that is further toward the seat upper side than the clip 38, and extend toward the seat lower side and arrive at the other end 44A that is connected to the clip 38.

Note that the above-described plural embodiments can be implemented by being combined appropriately. Further, in the respective embodiments, the vertical bar portions 14V of the stay 14 are not limited to two, and may be one. In a case in which the stay 14 has the horizontal bar portion 14H, the stay 14 can be made into a backward L-shape or a T-shape by this horizontal bar portion 14H and the one vertical bar portion 14V.

[Description of the Reference Numerals]

10 vehicle seat
12 headrest
14 stay
14H horizontal bar portion
14V vertical bar portion
16 cover
16C opening
16F opening
16G shaft portion (suppressing portion)
16R opening
16S side portion
18 torsion coil spring (elastic member)
20 vehicle seat 22 suppressing portion
24 seat back
28 foamed body (elastic member)
30 vehicle seat
32 supporting portion
38 clip (elastic member)
40 vehicle seat
44 rope
44A other end
44B one end
48 tension coil spring (second elastic member)
48A upper end
48B lower end
50 guide portion
52 seat back frame
54 holding portion

The invention claimed is:

1. A vehicle seat having a headrest that comprises:
a stay that has a vertical bar portion that is held at a seat back and extends toward a seat upper side, and a horizontal bar portion that is continuous with the vertical bar portion and extends in a seat transverse direction;
a cover that covers at least a portion of the stay, and that is supported at the horizontal bar portion of the stay so as to be swingable in a seat front-rear direction around the seat transverse direction;
a clip having a base portion that is fixed to the cover and runs along a side portion of the cover, and a pair of arm portions that are formed by bending from both ends of the base portion and that face one another, and the arm portions have a pair of fit-together portions that fit-together with the vertical bar portion so as to nip-in the vertical bar portion, so as to elastically deform and generate restoring force in a direction opposing a swinging direction of the cover when the cover swings in the seat front-rear direction; and
a suppressing portion that is provided between the stay and the cover so as to fit-together with the horizontal bar portion, and that suppresses displacement of the cover in other than the swinging direction.

2. The vehicle seat of claim 1, wherein the suppressing portion also serves as a supporting portion of the cover with respect to the stay.

3. The vehicle seat of claim 2, wherein the clip is inserted into the vertical bar portion side through an opening that is provided in the side portion of the cover.

4. The vehicle seat of claim 3, wherein a plurality of the openings are provided in a seat vertical direction.

5. The vehicle seat of claim 4, wherein an engagement portion, that engages with the cover when insertion into the opening is completed, is provided at the clip.

6. The vehicle seat of claim 3, wherein an engagement portion, that engages with the cover when insertion into the opening is completed, is provided at the clip.

7. The vehicle seat of claim 1, wherein the clip is inserted into the vertical bar portion side through an opening that is provided in the side portion of the cover.

8. The vehicle seat of claim 7, wherein a plurality of the openings are provided in a seat vertical direction.

9. The vehicle seat of claim 8, wherein an engagement portion, that engages with the cover when insertion into the opening is completed, is provided at the clip.

10. The vehicle seat of claim 7, wherein an engagement portion, that engages with the cover when insertion into the opening is completed, is provided at the clip.

11. A vehicle seat comprising:
a stay that has a vertical bar portion that is held at a seat back and extends toward a seat upper side, and a horizontal bar portion that is continuous with the vertical bar portion and extends in a seat transverse direction;
a cover that covers at least a portion of the stay, and that is supported at the horizontal bar portion of the stay so as to be swingable in a seat front-rear direction around the seat transverse direction;
a first elastic member that is interposed between the cover and the stay, and that, when the cover swings, elastically deforms and generates restoring force in a direction opposing a swinging direction of the cover;
a suppressing portion that is provided between the stay and the cover so as to fit-together with the horizontal bar portion, and that suppresses displacement of the cover in other than the swinging direction;
a second elastic member whose upper end is connected to the first elastic member side, and whose lower end is connected to the stay further toward a seat lower side than the first elastic member, and that can extend and contract in a seat vertical direction; and
a rope whose one end side is connected to the seat back side, and whose other end side is connected to the first elastic member, and that extends toward a seat upper side from the one end, and inverts at a guide portion that is further toward a seat upper side than the first elastic member, and extends toward a seat lower side and arrives at the other end,
wherein, when the headrest moves upward, due to a distance from the guide portion to the other end of the rope decreasing, the first elastic member is pulled by the rope and moves toward a seat upper side, and, when the headrest moves downward, the first elastic member is pulled by urging force of the second elastic member and moves toward a seat lower side.

12. The vehicle seat of claim 11, wherein the suppressing portion also serves as a supporting portion of the cover with respect to the stay.

* * * * *